Jan. 1, 1952 — R. H. HEWLETT — 2,580,777
FISHING REEL
Filed April 24, 1948
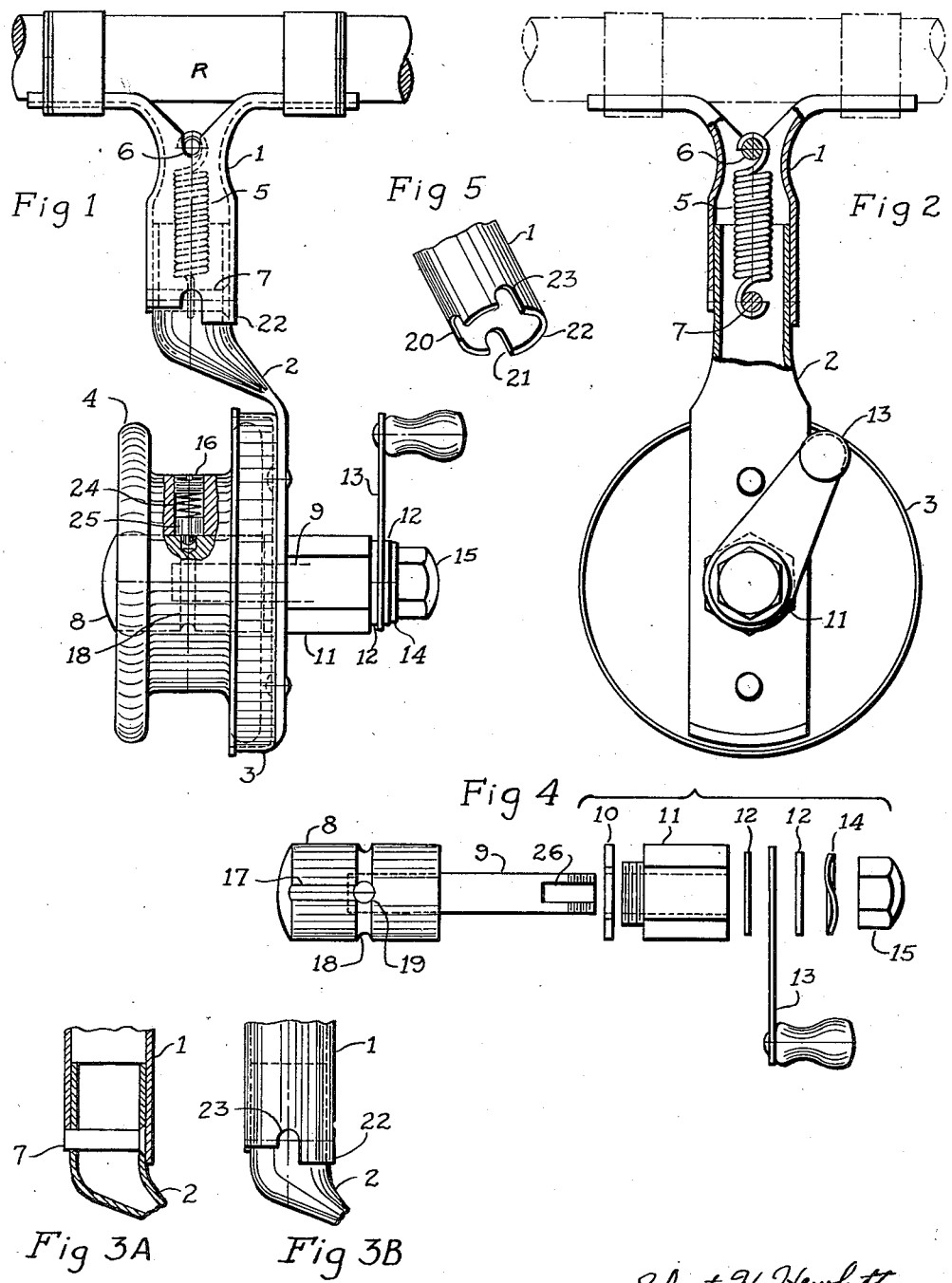
Robert H. Hewlett
INVENTOR Patented Jan. 1, 1952

2,580,777

UNITED STATES PATENT OFFICE 2,580,777

FISHING REEL

Robert H. Hewlett, Pittsburgh, Pa.

Application April 24, 1948, Serial No. 22,965

3 Claims. (Cl. 242—84.5)

My invention relates to reels that have a joint in the reel support to permit a rotary motion of the reel back and forth between the casting and reeling positions. These reels cast line from the open end of the reel spool, with the reel axis parallel to the rod and the spool remaining stationary, and re-wind the line on the spool when the reel is axially perpendicular to the rod and rotated by a crank.

Objects of my invention are: First, to provide in a reel of this type a novel swivel joint in the reel support with inherent means to lock the reel from further rotation when in its casting or re-winding positions, also means to limit the rotational swing of the reel to its operating positions, second, to provide in a reel of this type cooperative means to permit the user of the reel to maintain substantial control of the line-twist that is naturally imparted to the line by reels of this type; third, to provide in a reel of this type, simple means to prevent the line in a winding operation from over-riding the spool flange and fouling on the drive spindle; fourth, to provide in a reel of this type, means to actuate the reel to wind line with a fixed frictional torque.

The accomplishment and advantages of the above stated and further objects of my invention should readily become apparent in the accompanying drawing and description thereof.

Figure 1 is an elevated side view of the reel secured to the rod-butt R with the reel positioned for casting or un-winding line, and showing a cut of the securing device in the reel spool.

Figure 2 is an elevated side view of the reel secured to the rod-butt R as in Figure 1, with the reel positioned for reeling or winding line with the left hand, and showing a cross-sectional cut of the swivel joint.

Figure 3A is a cross-sectional view of the swivel joint without the securing spring.

Figure 3B is a solid view of the same.

Figure 4 is an exploded view of the actuating device for rotating the reel spool.

Figure 5 is a solid angular view of the outer portion of the swivel joint, showing the position locking notches and the lip-like extension.

Referring now in detail to the drawing, the tubular section 1, has its upper portion diametrically divided and angled out in opposite directions forming arcuated wings for attaching the reel to the rod-butt R in a suspended manner, as shown in Figures 1 and 2. The lower portion of the section 1 has on its end, three quadrantally spaced notches 20, 21, 23 and the lip-like extension 22 between notches 21 and 23, and directly opposite the notch 20, as shown in Figure 5. The tubular section 2 has its upper portion movably within the lower portion of section 1, with the notched-end of section 1 abutted on the extended portion of the beveled-headed pin 7, that is fitted diametrically through section 2 and retained therein by the lip-like extension 22, of section 1, as shown in Figure 3A. For securing section 2 within section 1, the contracting coil spring 5 is attached within the tubular joint; one end on the pin 7 in section 2, the other end on the pin 6 resting in the crotch formed by the attaching wings of section 1, as shown in Figure 2. The pin 6 has notched ends to hold it in place.

With sections 1 and 2 secured in this manner, the extended portion of the pin 7 is automatically forced to engage in any of the notches 20, 21 and 23. These notches have straight parallel sides and a depth equal to or greater than the extended portion of the pin 7, which prevents any rotary motion of section 2, within section 1, thus locking the reel against twisting or wresting action encountered when striking and playing a fish. To turn section 2 within section 1 for positioning the reel, pressure is applied on sections 1 and 2 sufficient to counter-act the tension of the securing spring 5 and extend the sections axially end-wise in opposite directions a distance sufficient to disengage the extended portion of the pin 7.

With this pressure thus maintained section 2 can be easily rotated back and forth until the extended portion of the pin 7 strikes the lip-like extension 22 of section 1, which limits the rotational movement of section 2 to the notched area of section 1, thus permitting the reel to be rotated only between its operating positions.

The lower portion of section 2 is gradually flattened and angled side-wise, thence completely flattened and angled downwards parallel to the joint axis so as to support the reel spool in a central alignment with said axis, as shown in Figure 1. On the flattened portion of section 2 is secured the circular, shallow, cupped shield 3. Fitted centrally through the flattened portion and the shield is the threaded tubular bearing block 11 secured by the nut 10. Rotatably mounted in the bearing block is the spindle 9, with the drum-like hub 8 on its inner-end. Yieldingly secured on, and rotatable with the hub 8 is the line spool 4 with one of its smoothly rounded end flanges residing spacedly within the shield 3. Securing means comprises the shouldered pin 25 and the expanding coil spring 24 that is diametrically centered in the spool 4 under the cup screw 16. The thinner end of the pin 25 extends through the inner-wall of the spool, and engages in the boring 19 in the hub 8 a depth sufficient to lock the spool rotatable with the hub, as shown in Figure 1.

In Figure 4 the groove 17 in the hub 8 extends axially between the boring 19 and the outer end of the hub and conforms to the rounded head of the pin 25 at its boring end, to cause the pin to rise from the boring when the spool is urged axially from the hub. Likewise the rounded end of the hub causes the pin to yield within the spool when the spool is urged on to the hub.

Also shown in Figure 4 is the shallow annular groove 18 which guides the pin to the boring; when the spool is urged on to the hub, the pin drops into the groove 18 and, when the spool is rotated on the hub or vice-versa, the pin follows along the groove to locking registry in the boring 19. With the spool secured in the manner described it can easily be reversed end for end on the hub as required when the reel is in use.

The outer end of the spindle 9 is threaded a spaced distance, and the entire portion extending beyond the bearing block 11 is reduced to the flat opposite parallel cheeks 26, as shown in Figure 4. Rotatably mounted on the reduced portion of the spindle is the flat, non-ferrous metal crank 13, its hub between the identical flat steel washers 12 and 12 that are adapted to rotate with the spindle. These washers are forced to grip the crank hub with a fixed frictional pressure exerted by the resilient washer 14 that is compressed between the outer steel washer 12 and the jam cap nut 15 threaded on the spindle end.

Thus the spindle, hub and spool are rotated with a fixed non-variable frictional torque that is favorable to the minimum strength of the fine lines used on reels of this type. Should a change in the frictional torque be desired, the washer 14 can be replaced with one having the proper resiliency to provide the desired torque.

Referring back to the restricted swivel joint, the notches 20, 21 and 23 secures the reel in the proper attitude with the rod for casting or re-winding line. Notch 20 locks the reel axially parallel to the rod and in position to cast line from the open end of the spool, which remains stationary. Notch 21 locks the reel axially perpendicular to the rod and in position to reel or wind line on the spool, with the crank to the left of the rod, as shown in Figure 2. Notch 23 locks the reel axially perpendicular to the rod and in position to reel or wind line on the spool, with the crank to the right of the rod. This last mentioned position is not shown in the drawing but it should be readily understood.

Having described my reel, the simple economic method of construction and distinct advantages in its operation and use should be readily apparent. To operate the reel the spool is provided with the proper line and attached to a fishing rod in a suspended manner, as shown in Figure 1. The line is threaded through the line guides on the rod and a bait or lure is secured to the end of the line.

To cast the lure or bait the reel is turned to the casting position which permits the line to spiral freely over the free end of the reel spool and out through the line guides. To re-wind the line on the spool to retrieve the bait or lure the reel is turned to either the left or the right hand winding positions as desired, and the spool is rotated with the crank. When line is cast or un- wound from a spool in the manner described a twist is imparted to the line, directionally opposite of the un-winding direction, and remains in the line when the line is re-wound on the spool. Now it is easily understood that after a number of casts are made the line will become so badly twisted as to be unusable. I have found that the most practical way to control this line twist is to alternate the un-winding direction of the line, and this is accomplished by reversing the spool on its hub. But to maintain the winding rotation of the spool in the same direction, the winding position of the reel is also reversed when the spool is reversed. For example, several casts are made with the reel being operated in the right hand winding position, then the spool is reversed end for end on the hub and several casts are made with the reel being operated in the left hand winding position. In this manner the twist that is imparted to the line in one un-winding direction is taken out in the opposite unwinding direction. This permits the operator of the reel to maintain positive control of the line twist or any other twist that may be imparted to the line by revolving lures and the like.

It will also be evident that the shield 3 which is in spaced relation to the spool, prevents the line in a winding operation from over-riding the inner flange of the spool and becoming fouled on the drive spindle. The shield also protects the spool when the reel is at rest and strengthens the reel supporting section.

A minor fault of reels of this type is the lateral throw of the line striking against the rod when the line is rapidly un-wound from the spool during the casting operation. To overcome this fault without the use of additional appendages, the reel is supported a sufficient distance from the rod to prevent this line contact.

Although I have shown and described my reel in a desired form it will be readily understood that certain changes may be made in this form and the arrangement, detail and size of the various elements without departing from the spirit of my invention. What is claimed is:

1. A fishing mechanism comprising a tubular support, a swivel joint in said support and a circular cupped shield attached on one end portion, a spindle rotatably supported on said end portion, said spindle having a drum-like hub on one end, a spool secured on said hub rotatable with said hub but yieldingly releasable from said hub, a manually operable crank secured on the other end of said spindle; the other end portion of said support being diametrically divided and angled out in opposite directions forming arcuated wings for attaching to a fishing rod, and elements of said swivel joint comprising intermediate portions of said support telescoping movably one within the other, resilient means within the joined portions securing said portions one within the other, U notches in the end of the outer portion automatically engaging a protuberance of the inner portion for securing the spool supporting section non-rotatable in a first position with the spool axis parallel to the attaching wings, and in a second position with the spool axis perpendicular to the attaching wings, and in a third positon the direct opposite of the second position, said resilient means urgingly yielding said joined portions end-wise for disengaging said protuberance to change the position of the spool supporting section.

2. The mechanism in claim 1 and said spool having identical end flanges, and one end flange in spaced relation within said cupped shield, a shouldered pin and spring diametrically centered in said spool, said pin having a small end extending through the inner wall of the spool and engaging in a boring in said hub for securing said spool rotatable with said hub, a groove in said hub extending axially between said boring and the outer end of said hub and conforming substantially to the semispherical end of said pin, permitting said pin to be urged from said boring for releasing said spool from said hub, a shallow annular groove in said hub intersecting said boring for guiding said pin to said boring, said hub having a beveled free end permitting said spool to be urged on said hub.

3. In fishing mechanisms and the like a tubular section having one end portion diametrically divided and angled out in opposite directions forming attaching wings for securing to a fishing rod, the other end portion having on its end three quadrantally spaced U notches and a lip-like extension opposite the central notch and between the diametrically opposite notches, a second tubular section having one end portion telescoping movably within said notched end portion of the first section, the extended portion of a headed pin in said second section abutting the notched end of the first section, a coiled spring within the joined portions having one end attached to the first section and the other end attached to the second section securing said sections one within the other and automatically maintaining the extended portion of said pin engaged in any of said U notches and said spring yielding said sections end-wise in opposite directions for disengaging said pin to rotate said second section, said lip-like extension butting said pin for limiting said rotation, the other end portion of said second section being disposed to one side and parallel to a line of the joint axis, a cupped circular shield member secured thereto, a spindle rotatably supported thereon and centered in said shield, a drum-like hub on one end of said spindle, a spool mounted on said hub, a pin and spring secured in said spool, said pin extending through the inner wall of said spool and engaging a boring in said hub securing said spool rotatable with said hub, a horizontal groove in said hub extending between said boring and the free end of said hub permitting said pin to yield from said boring for releasing said spool from said hub, a shallow annular groove intersecting said boring for guiding said pin to said boring, a rounded free end on said hub permitting said spool to be urged on said hub, a crank on the other end of said spindle for manually operating said spindle hub and spool, and said notches of said first section cooperating with said pin in said second section for securing said second section non-rotatable in a first position with the spool axis parallel to said attaching wings and in a second position with said spool axis perpendicular to said attaching wings and in a third position the exact opposite of the second position.

ROBERT H. HEWLETT.

REFERENCES CITED

The following references are of record in the file of this patent:

UNITED STATES PATENTS

| Number | Name | Date |
|---|---|---|
| 1,341,519 | Reuze | May 25, 1920 |
| 2,136,438 | Horsrud | Nov. 15, 1938 |
| 2,299,156 | Lind | Oct. 20, 1942 |

FOREIGN PATENTS

| Number | Country | Date |
|---|---|---|
| 1,905 of 1912 | Great Britain | July 11, 1912 |
| 50,314 | Switzerland | Feb. 9, 1910 |
| 649,232 | France | Aug. 27, 1928 |